United States Patent
Wöstmann et al.

(10) Patent No.: US 12,362,637 B2
(45) Date of Patent: Jul. 15, 2025

(54) COIL AND METHOD AND TOOL FOR PRODUCING COIL

(71) Applicant: Fraunhofer-Gesellschaft zur Förderung der angewandten Forschung e.V., Munich (DE)

(72) Inventors: Franz-Josef Wöstmann, Bremen (DE); Michael Heuser, Bremen (DE); Matthias Busse, Bremen (DE); Lukas Stumm, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 220 days.

(21) Appl. No.: 17/277,903

(22) PCT Filed: Sep. 19, 2019

(86) PCT No.: PCT/EP2019/075165
§ 371 (c)(1),
(2) Date: Mar. 19, 2021

(87) PCT Pub. No.: WO2020/058400
PCT Pub. Date: Mar. 26, 2020

(65) Prior Publication Data
US 2021/0351675 A1 Nov. 11, 2021

(30) Foreign Application Priority Data
Sep. 19, 2018 (DE) .................... 10 2018 215 972.6

(51) Int. Cl.
*H02K 15/043* (2025.01)
*B21J 5/00* (2006.01)
(Continued)

(52) U.S. Cl.
CPC .......... *H02K 15/0432* (2025.01); *B21J 5/002* (2013.01); *H01F 41/04* (2013.01); *H01F 41/041* (2013.01); *H01F 41/077* (2016.01)

(58) Field of Classification Search
CPC .......... H01F 41/077; H01F 2041/0711; H01F 41/041; H01F 2017/006; H01F 2017/0073;
(Continued)

(56) References Cited

U.S. PATENT DOCUMENTS 4,581,598 A * 4/1986 York .................. Y10T 29/4902
336/200
4,621,231 A * 11/1986 Heinrich .............. H01F 41/041
336/200
(Continued)

FOREIGN PATENT DOCUMENTS

CN 104904102 A 9/2015
DE 102010020897 A1 11/2011
(Continued)

OTHER PUBLICATIONS

Machine Translation of Japanese Patent Publication, JP 2015-2614, Mar. 2023. (Year: 2023).*
(Continued)

*Primary Examiner* — A. Dexter Tugbang
(74) *Attorney, Agent, or Firm* — Faegre Drinker Biddle & Reath LLP

(57) ABSTRACT

A method for producing a coil includes casting; a semi-finished product in a cavity of a casting tool and the coil is formed following a demolding of the semi-finished product by shaping this semi-finished product, wherein the form of the semi-finished product may be derived from a shape of the finished coil by stretching along a longitudinal axis of the coil and/or by bending this longitudinal axis, and wherein
(Continued)

the semi-finished product, during the shaping, is bent and compressed so that windings of the coil already present in the semi-finished product are brought closer to one another at least in some regions and are brought into an arrangement along the longitudinal axis of the finished coil, wherein the product, whilst being shaped, is twisted or bent by no more than a right angle over the course of each individual turn.

12 Claims, 3 Drawing Sheets

(51) Int. Cl.
    *H01F 41/04*     (2006.01)
    *H01F 41/077*     (2016.01)

(58) Field of Classification Search
CPC .............. H01F 27/306; H01F 41/0206; H02K 15/0471; H02K 15/0464; H02K 3/04; H02K 3/14; H02K 15/0407; H02K 15/0435; H02K 15/0478; Y10T 29/4902; Y10T 29/49071; Y10T 29/49073; B21J 5/002
See application file for complete search history.

(56) References Cited

U.S. PATENT DOCUMENTS

| | | | |
|---|---|---|---|
| 2006/0179644 A1 | 8/2006 | Maruyama et al. | |
| 2009/0002111 A1* | 1/2009 | Harrison | Y10T 29/4902 336/96 |
| 2010/0253459 A1* | 10/2010 | Zimmerman | H01F 27/306 336/180 |
| 2011/0079089 A1* | 4/2011 | Rogers | H01F 2041/0711 29/605 |
| 2018/0198318 A1* | 7/2018 | Jain | H01F 41/041 |
| 2020/0028416 A1 | 1/2020 | Bergmann et al. | |

FOREIGN PATENT DOCUMENTS

| | | |
|---|---|---|
| DE | 102012212637 A1 | 1/2014 |
| DE | 102014222468 A1 | 5/2016 |
| DE | 102015113858 A1 | 2/2017 |
| EP | 2819276 A2 | 12/2014 |
| JP | 59-053065 A | 3/1984 |
| JP | 2004-312889 A | 11/2004 |
| JP | 2004-336969 A | 11/2004 |
| JP | 2005-051846 A | 2/2005 |
| JP | 2011-188721 A | 9/2011 |
| JP | 2015-002614 A | 1/2015 |
| JP | 2020-516053 A | 5/2020 |
| JP | 2020188586 A * | 11/2020 |
| WO | 2018/135086 A1 | 7/2018 |

OTHER PUBLICATIONS

Groninger et al, "Cast coils for electrical machines and their application in automotive and industrial drive systems," 2014, 4th International Electric Drives Production Conference (EDPC), Nuremberg, Germany, 2014, pp. 1-7. (Year: 2014).*
Groninger M et al. "Casting production of coils for electrical machines" Electric Drives Production Conference (EDPC), 2011 1st International IEEE, Sep. 28, 2011 (Sep. 28, 2011), pp. 159-161.
International Search Report and Written Opinion received for PCT Patent Application No. PCT/EP2019/075165, mailed on Dec. 19, 2019, 24 pages. (10 pages of English Translation and 14 pages of Original Document).

* cited by examiner

COIL AND METHOD AND TOOL FOR PRODUCING COIL

CROSS REFERENCE TO RELATED APPLICATIONS

The present application is a national stage application of International Application No. PCT/EP2019/075165, filed Sep. 19, 2019, which claims priority to German Application No. DE102018215972.6, filed Sep. 19, 2018, the disclosures of which are hereby incorporated by reference in their entireties.

BACKGROUND OF THE DISCLOSURE

Wound coils are used in electric machines. The coils thus produced only fill part of the available installation space. This results in a lower power or torque density of the electric machines in relation to the weight or the installation space.

This disadvantage may be counteracted by the use of cast Al and Cu coils, however, until now, there has not been a method available for the production of cast Al and Cu coils or cast coils made from Al and Cu alloys in permanent molds with sufficient service lives that is suitable for series manufacture.

In order to increase the power density or the torque density of electric machines, complex and often manually produced coils were previously wound in order to improve the filling degree only marginally as compared to series manufacturing processes. Wire of constant cross-section is used over the height of the windings. In this case, in conventional electric machines, the windings of the coil arranged on top of one another from the inside outwardly impair the heat dissipation and lead to more intense heating of the coils and therefore to a necessary limitation of the maximum current density in relation to the cross-section of the winding.

Cast Al and Cu coils or cast coils made of Al and Cu alloys are known per se, but until now were not produced in permanent molds, but in lost cores, for example in investment casting or in a lost foam process or by the use of salt cores, which define the contour and prevent the melt from coming into direct contact with the tool.

According to the prior art, a contour-defining mold is used to produce a wide range of different geometries. In the case of complex geometries, cores are inserted or sliders are used in addition to the mold, which has one or more partitions to allow simple removal of the cast part.

When producing copper components, increased demands are placed on the tool and core due to the high casting temperature, which is above 1100 degrees degrees Celsius. The thermal stress and in particular the temperature shock during the filling of the mold lead to a rapid aging of and damage to conventional materials. This aging is manifested by erosion and cracks in the tool or core. These cracks are in turn characterized by raised burrs on the surface of the demolded components. As a result, the tool service life is very short, the component quality is heavily compromised, and significant finishing work is required. On the whole, it is very difficult to achieve economical results using conventional tool steels.

Previous tool concepts have already led to geometrically complex permanent molds or to the additional use of movable permanent or non-permanent, i.e. lost, sliders or cores. These molds might have been used merely in a laboratory setting, because a high effort was required for the maintenance of the molds, which was also associated with high scrap rates.

EP Patent Application Publication No. 2 819 276 A2 discloses a geometrically modified model geometry which allows an easily formed two-part permanent mold, for example for a pressure die casting process. This is achieved in that the windings are each rotated through 180 degrees and therefore the geometric complexity of the coil is significantly reduced. Here, however, after the casting process, an incredibly highly complex shaping process step is necessary in order to achieve the coil geometry in the assembled state. The geometric simplification is therefore achieved by a further, downstream, complex process step.

SUMMARY

An object of the invention is to overcome the described difficulties and disadvantages and to propose a method suitable for series manufacture, with which coils of desired geometry which are intended to utilize an installation space to the best possible extent may be produced with minimal outlay. A further object of the invention is to offer a coil that may be produced easily and with little effort which manages with a relatively small installation space, and to propose a suitable tool for producing such a coil or for carrying out a corresponding production method.

These objects are achieved by a method according to the claims, a coil according to the claims, and a casting tool according to the claims. Advantageous embodiments and refinements of the invention will also become clear from the claims.

In the proposed method for producing a coil, a semi-finished product in the form of an elongate conductor is firstly formed by casting in a cavity of a casting tool, and the coil is then formed, after demolding the semi-finished product, by shaping this semi-finished product. In accordance with the invention, the cavity of the casting tool is formed here so that the shape of the semi-finished product may be derived from a form of the finished coil by stretching along a longitudinal axis of the coil and/or by bending this longitudinal axis. During the shaping to form the coil, the semi-finished product is bent and compressed so that windings of the coil already present in the semi-finished product are brought closer to one another at least in some regions and are brought into an arrangement along the longitudinal axis of the finished coil, wherein the conductor, whilst being shaped, is twisted or bent by no more than a right angle over the course of each individual winding.

Advantages of this method result, on the one hand, by the design of the cast semi-finished product preferably without any undercuts, which allows a simple construction of the casting tool without lost tool parts and makes the demolding easy, and, on the other hand, by the relatively uncomplicated shaping by which the semi-finished product is transferred into the form of the finished coil.

The semi-finished product may be formed as a rosette, such that the windings are arranged in a manner fanned out around a center point prior to the shaping. In this case, the cavity of the casting tool corresponding to the form of the semi-finished product may be filled from the center when casting the semi-finished product, such that a sprue or a plurality of sprues is formed centrally in the rosette. This results advantageously in short flow paths for the material forming the semi-finished product or the conductor of the coil. In particular, the cavity of the casting tool may be filled centrally from below when forming the semi-finished product.

The cavity may be formed in particularly simple embodiments by just two tool halves of the casting tool. The semi-finished product may be demolded by separating the tool halves in a direction in which the semi-finished product is free from undercuts, preferably in the direction of an axis of the rosette. In this case, there is typically no need for any additional mold cores, sliders or lost mold parts. In any case, the casting tool may be a re-usable permanent mold, and therefore the method may be performed economically and is suitable for series manufacture.

The material used to cast the semi-finished product and to form the conductor is typically a metal having good conductivity. In particular, the semi-finished product may be formed from aluminum or copper or an alloy containing aluminum or copper.

In order to form the coil, the semi-finished product is typically plastically deformed, preferably without melting the material forming the semi-finished product.

In order to shape the semi-finished product, the windings may be slid over a guide rod or mandrel, at the end of which there may be arranged a shoulder which may serve as a stop for a first winding. Behind the coil thus created, a further tool part may be slid onto the guide rod or mandrel, with the aid of which the windings may be pressed together.

The conductor is typically formed with a flat cross-section which in the direction of the longitudinal axis of the coil has a smaller diameter and in a direction perpendicular to the longitudinal axis of the coil has a larger diameter. A particularly space-saving construction of the coil may thus be achieved.

A coil produced by a method of the described kind is advantageous accordingly. Such coils are suitable for use in electric machines, in particular electric motors. The advantages of the coil produced in this way are particularly evident in applications in which a space-saving and weight-saving embodiment is important, for example in electric motors in aircraft, where correspondingly equipped electric motors may be used for example as a drive for rudders, flaps or landing gear parts.

A casting tool suitable for carrying out the described method and for producing a corresponding coil or a corresponding semi-finished product may comprise two tool halves, which surround a cavity that is free from undercuts in a demolding direction, wherein the cavity forms a sequence of windings which are arranged in a manner fanned out around a center, the demolding direction corresponding to a direction of an axis of the rosette. This casting tool is preferably designed to fill the cavity from the center.

BRIEF DESCRIPTION OF THE DRAWINGS

Embodiments of the invention will be explained hereinafter with reference to the drawings.

In the drawings.

DETAILED DESCRIPTION OF THE DRAWINGS

Figure 1:
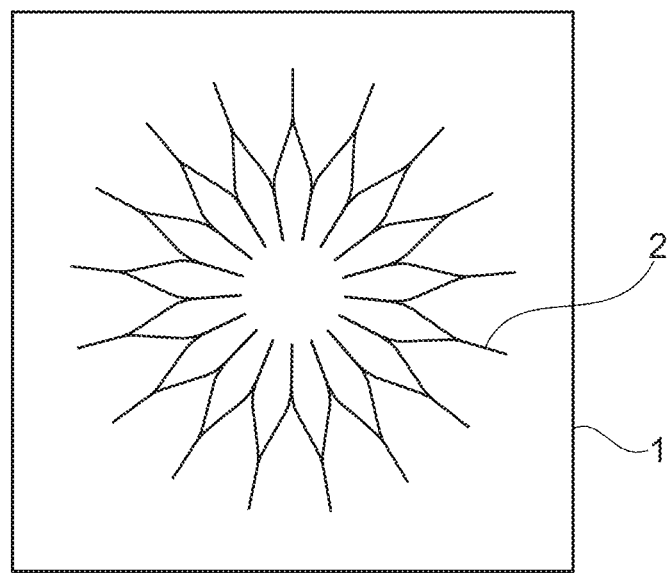
FIG. 1 shows a frontal view of one of two tool halves of a casting tool.

FIG. 1 shows the lower tool half 1 of a casting tool. A rosette-shaped cavity 2 of this casting tool can be seen and may be closed by connecting the lower tool half 1 to an upper tool half 3 (see FIG. 2).

Figure 2:
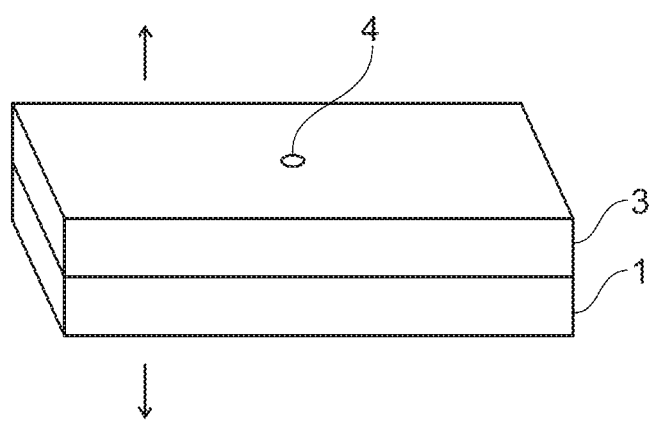
FIG. 2 shows a perspective representation of the casting tool of FIG. 1 with both tool halves in a closed state.

The fully closed casting tool can be seen in FIG. 2. There, an inlet opening 4 is also shown, through which the cavity 2 may be filled, more specifically from a center of a rosette formed by the cavity. This casting mold is a re-usable permanent mold.

Figure 3:
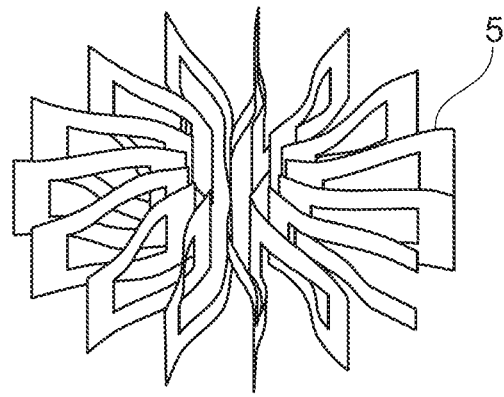
FIG. 3 shows a perspective representation of a semi-finished product produced by casting in the casting tool of FIG. 1.
Figure 4:
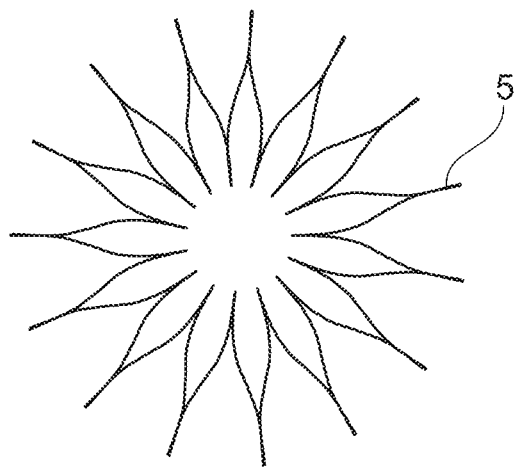
FIG. 4 shows a plan view of the semi-finished product of FIG. 3.

In FIGS. 3 and 4, a semi-finished product 5 formed by casting in this casting tool is shown and may be formed from aluminum, copper or an alloy containing aluminum or copper. The semi-finished product 5 is an elongate conductor, which already forms windings of a coil formed therefrom subsequently. In this case, the semi-finished product 5 is formed in the form of a rosette correspondingly to the form of the cavity 2, such that the windings are arranged in a manner fanned out around the center. The semi-finished product 5 shown in FIGS. 3 and 4 is free from undercuts in the direction of an axis of the rosette and may therefore be demolded by separating the tool halves 1 and 3 from one another in the direction of this axis after the casting and curing of the semi-finished product 5. This direction is shown in FIG. 2 by two arrows. In this case, the casting mold requires neither a mold core nor any sliders or lost mold parts.

Figure 5:
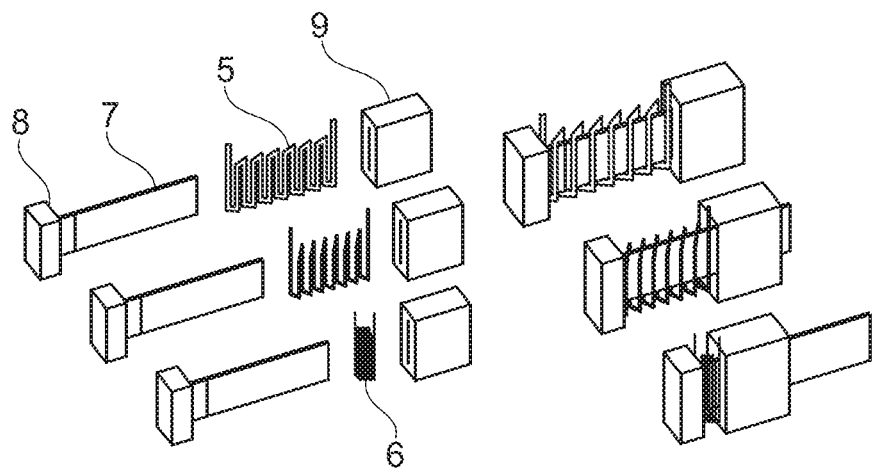
FIG. 5 shows, in each case in a perspective representation, two parts of a shaping tool and a coil produced from the semi-finished product of FIG. 3 in three successive stages of a shaping process, more specifically in each case on the left separately in an exploded view and on the right with windings of the semi-finished product or of the resultant coil slid over a guide rod or mandrel.

The semi-finished product 5 is plastically deformed—without melting the material forming the semi-finished product or the conductor—in order to form a coil 6 (see FIG. 5). To this end, the semi-finished product 5 is bent and compressed such that the windings of the resultant coil 6 are moved toward one another during the shaping, that is to say are brought closer together, and are brought into an arrangement along a longitudinal axis of the finished coil 6. In this case, the conductor is twisted and bent through no more than approximately 20 degrees over the course of each individual winding. This is possible because the cavity 2 of the casting tool is formed here so that the shape of the semi-finished product 5 formed therein may be derived from the later form of the finished coil 6 by stretching along the longitudinal axis of the coil 6 and by bending this longitudinal axis.

As can be seen in FIG. 5, the semi-finished product 5 may be shaped to form the coil 6 by means of a shaping tool that has a guide rod or mandrel 7, with a shoulder 8 arranged at its end. The windings of the semi-finished product 5, in order to be shaped, may be slid over this guide rod or mandrel 7, which for this purpose is threaded through the windings. The shoulder 8 is used here for a first winding. A further tool part 9 may be slid onto the guide rod or mandrel 7 after the semi-finished product 5 from which the coil 6 is thus formed, so as to press the windings together and give the coil 6 its ultimate form in which it fills only an extremely small volume.

Figure 6:
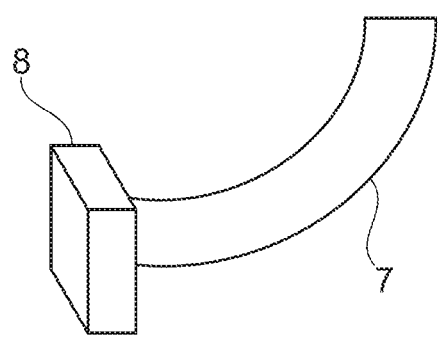
FIG. 6 shows, in a perspective representation, a variant of the shaping tool, in which the guide rod or mandrel is curved.

In FIG. 5 the semi-finished product 5 is shown already in a straightened form, in which the rosette is opened out and the windings are arranged along the longitudinal axis of the coil 6 and aligned with one another. A modification of the shaping tool with which the straightening of the semi-finished product 5 or the rosette may be simplified and completed when the windings are pressed together is shown in FIG. 6. The guide rod or mandrel 7 is curved in this modification.

The conductor initially forming the semi-finished product 5 and later forming the coil 6 has a flat cross-section which in the direction of the longitudinal axis of the coil 6 has a smaller diameter and in a direction perpendicular to the longitudinal axis of the coil has a larger diameter.

The coil 6 may be used in an electric machine, for example an electric motor. Such an electric motor may be used in an aircraft, for example as a drive for a rudder, a flap or a retractable landing gear.

Due to the typically symmetrical arrangement of the cast part, that is to say the semi-finished product 5 in the case of the described embodiment, the production may also be performed by means of centrifugal casting. A plurality of cavities may be arranged in succession for a multiple occupancy.

In a conventional approach with two mold halves, in the case of low-pressure die casting the cavity may be filled centrally from below and the gate may be closed mechanically or a correspondingly thin-walled design and/or temperature control in the gate region may lead to a rapid solidification in order to achieve a closure in the gate region. A ram may then be introduced from above into the center, which is still molten, and material may then be supplied to the outer contour under the pressure of the ram. The laminar mold filling of the low-pressure die casting method is then combined with a pressure-assisted material supply, i.e. high-pressure die casting.

The casting tool may be designed so that the center of the cavity consists of a crucible into which a metallic granular material is filled, which is melted by induction. After the melting in the crucible:

- the mold and the crucible may be set in rotation, the melt being pressed over the edge of the crucible into the cavity by means of the centrifugal force and corresponding crucible design, or
- a ram having cutouts for the gate regions may be driven from above into the mold, thus pressing the crucible wall downward. The bottom of the crucible remains in its position. Due to the downward pressing of the crucible wall, the gates of the contour to be cast are exposed and the melt located in the crucible is pressed into the cavity through the openings in the ram corresponding to the gates.

By means of the invention described here on the basis of various embodiments, a method for reducing the complexity of the production of coils is proposed, whereby said coils may be produced in geometrically simple two-part permanent molds. This is achieved by a combination of casting process and subsequent plastic deformation of the coil, thus significantly simplifying the production process. The geometry of the coil for tool construction is thus pulled apart from itself virtually so to speak and is arranged in circular fashion (in a rosette-like manner) in order to provide a geometry that is free from undercuts and may be inserted in a two-part tool, as shown in FIGS. 1 to 4.

After the casting process, the coil is plastically deformed again in order to achieve the geometric assembled state. The sprue is arranged in the center of the geometry, thus allowing the mold to be filled symmetrically and with the shortest possible flow paths. Similarly to the case illustrated in the drawings, in which the deformation is performed longitudinally over the coil, a deformation over the short side, i.e. the winding head, is also possible. The geometry may be used here in different casting processes, in particular gravity sand casting, low-pressure sand casting, gravity permanent mold casting, low-pressure permanent mold casting and also pressure die casting, with use of a central sprue. A model for investment casting made of wax or plastic may also be sprayed, and for a lost foam process may be foamed. Furthermore, due to the central arrangement of the sprue, a stack casting process may be realized, in which, in all stated processes, a plurality of coil tools may be stacked on top of one another and demolding performed in one demolding process. The tool inserts in this case may be made of conventional tool materials, or, especially for the high temperature stress during the processing of copper and the high tool load with use of aluminum, may be made of ceramic materials.

The production of a coil described here is characterized by a simple tool geometry, the resultant possible simple production of a semi-finished tool for the coil, and the simple subsequent finishing work. The sprue region may be used here for the handling processes. The sprue reinforces the coil geometry and may be removed after the fundamental subsequent processes. With an optimal positioning of the gates, for example in the middle of the winding or at the edge, the gate may be removed as a last step prior to the shaping, and any remaining burr may be tolerated. The entire mold geometry may also be designed so that possible burrs may be tolerated, in order to facilitate the manufacture. To this end, the casting tool for example may be designed so that the burrs on the finished coil created by the demolding process in each case come to lie in cavities provided for this purpose on a surface of an adjacent winding.

Following the production of the wound geometry, this is supplied to further process steps, such as deburring, polishing, cleaning, grinding, coating. In this case the geometry has proven to be advantageous due to the improved accessibility on account of the pre-formed coil. For necessary handling of the semi-finished product, positioning, fixing and handling aids, etc. may be incorporated in the tool contour in the production process and may be removed or used for further processing as required. The second key advantage of this geometry variant is the simple shaping process after the casting by insertion of a guide rod into the center of the winding and direct shaping of the windings against one another. This is achieved by threading the coil onto a mandrel having a shoulder, as shown in FIGS. 5 and 6. With the aid of this design, the coil is deformed or brought back into the assembled stated. The shaping process and calibration may be combined here. The guide rod may be thin at the starting end in order to facilitate the threading and then becomes thicker toward the pressure-applying stop face—i.e. Of the shoulder 8—and corresponds there to the end contour of the interior of the winding. Ideally, the end contour of the interior has at least the same height as the overall coil to be achieved; see FIGS. 5 and 6.

A use of the production method proposed here may also still be evident from the finished product. Simple visual inspections of the cast body and a metallographic analysis thus indicate the manufacturing history of the cast parts. In particular, the plastically deformed regions in the windings and winding head may be evidenced metallographically.

What is claimed is:

1. A method for producing a coil, the method comprising:
casting a semi-finished product in a form of a single elongate conductor in a cavity of a casting tool, wherein the coil is formed following demolding of the semi-finished product by reshaping the semi-finished product;

wherein the form of the semi-finished product is derived from a shape of the coil by at least one of stretching along a longitudinal axis of the coil and bending the longitudinal axis, wherein the semi-finished product is formed as a rosette, formed by the single elongate conductor, such that windings are arranged fanned out around a center point prior to the reshaping;

reshaping the semi-finished product, wherein the semi-finished product, during the reshaping, is bent and compressed so that the windings of the coil already present in the semi-finished product are brought closer to one another at least in some regions and are brought into an arrangement along the longitudinal axis of the coil, wherein the elongate conductor, whilst being shaped, is one of twisted and bent by no more than a right angle along each individual winding of the coil.

2. The method according to claim 1, wherein, when casting the semi-finished product, the cavity of the casting tool is filled from a center.

3. The method according to claim 1, wherein the cavity is formed by two tool halves of the casting tool and the semi-finished product is demolded by separating the tool halves in a direction in which the semi-finished product is free from undercuts.

4. The method according to claim 1, wherein the casting tool is a permanent mold.

5. The method according to claim 1, wherein the semi-finished product comprises one of at least one of aluminum, and copper.

6. The method according to claim 1, wherein the semi-finished product is plastically deformed to form the coil.

7. The method according to claim 1, wherein the windings, for shaping the semi-finished product, are slid over one of a guide rod and a mandrel.

8. The method according to claim 1, wherein the elongate conductor has a flat cross-section, the flat cross-section in a direction of the longitudinal axis of the coil has a smaller diameter and in a direction perpendicular to the longitudinal axis of the coil has a larger diameter.

9. The method according to claim 1, wherein the semi-finished product is cast in at least one of a low-pressure die casting process, a high-pressure die casting process, a centrifugal casting process, and a gravity casting process.

10. The method according to claim 1, wherein, when forming the semi-finished product, after a first filling of the cavity at a lower first pressure at least one of (1) a gate of the casting tool is closed by one of mechanically and by accelerated solidification in a gate region and (2) a ram is introduced into a filled center of the casting tool, which includes molten material, and the cavity is filled with material at a higher second pressure produced by the ram.

11. The method according to claim 1, wherein the casting tool further comprises a crucible connected to the cavity and arranged centrally in the casting tool, the crucible being filled with a metallic granular material, the metallic granular material being melted in the crucible and used to fill the cavity.

12. The method according to claim 11, wherein the metallic granular material is melted by at least one of (1) induction in the crucible and (2) being pressed into the cavity by one of rotation of the crucible and pressure of a ram.

* * * * *